(12) United States Patent
Wölk

(10) Patent No.: US 8,105,069 B2
(45) Date of Patent: Jan. 31, 2012

(54) APPARATUS FOR MAKING HOLLOW BODIES FROM THERMOPLASTIC FILM

(75) Inventor: Frank-Michael Wölk, Reinfeld (DE)

(73) Assignee: Gambler Thermoform GmbH & Co. KG, Luebeck (DE)

( * ) Notice: Subject to any disclaimer, the term of this patent is extended or adjusted under 35 U.S.C. 154(b) by 259 days.

(21) Appl. No.: 12/497,860

(22) Filed: Jul. 6, 2009

(65) Prior Publication Data

US 2010/0009023 A1     Jan. 14, 2010

(30) Foreign Application Priority Data

Jul. 11, 2008   (DE) .......................... 10 2008 032 806

(51) Int. Cl.
*B29C 51/22* (2006.01)
(52) U.S. Cl. ..................... 425/398; 425/403.1; 425/441; 425/444
(58) Field of Classification Search .................. 425/388, 425/398, 292, 403.1, 441–444
See application file for complete search history.

(56) References Cited

U.S. PATENT DOCUMENTS

| | | | | |
|---|---|---|---|---|
| 6,135,756 A | * | 10/2000 | Arends | 425/398 |
| 6,558,150 B1 | * | 5/2003 | Karbach | 425/441 |
| 6,712,599 B2 | * | 3/2004 | Schlimgen et al. | 425/409 |
| 7,560,063 B2 | * | 7/2009 | Schlosser et al. | 264/550 |

FOREIGN PATENT DOCUMENTS

| | | |
|---|---|---|
| DE | 19710475 | 9/1998 |
| EP | 1314536 | 4/2004 |

* cited by examiner

*Primary Examiner* — Richard Crispino
*Assistant Examiner* — Thukhanh Nguyen
(74) *Attorney, Agent, or Firm* — Andrew Wilford

(57) ABSTRACT

An apparatus for forming shaped bodies from a thermoplastic film has a stationary support, a downwardly directed upper tool fixed on the support, means for feeding the film in a transport direction in steps underneath the upper tool, a lower shaft pivotal in support below the traverse, a frame carried on the shaft and pivotal therewith about an axis of the shaft, an upwardly directed lower tool shiftable on the frame toward and away from the axis, a pair of arms extending radially from the shaft, a link extending between one of the arms and the lower tool, and a crank drive element. A connecting rod extends between the other of the arms and the crank drive element. A stationary cam adjacent the frame has a non-straight cam formation, and a cam follower on the tool engages the cam formation. A drive rotates the crank drive element.

10 Claims, 8 Drawing Sheets

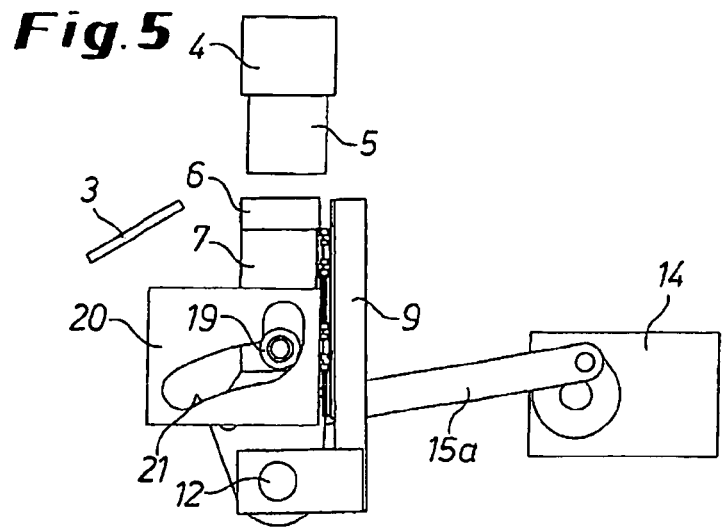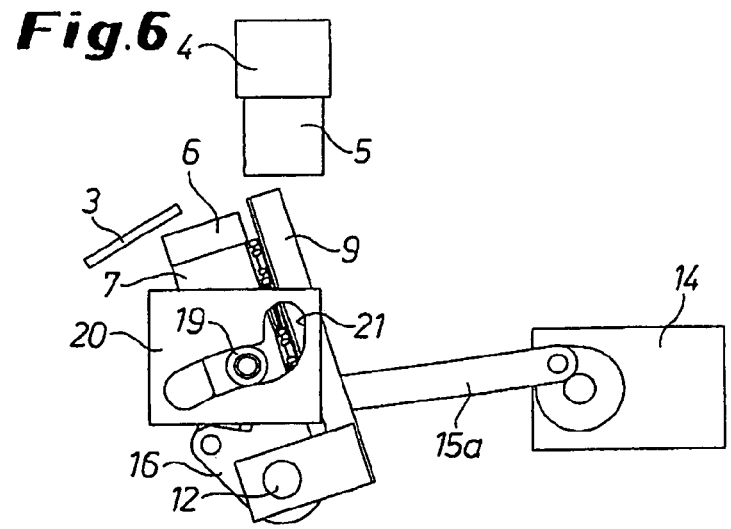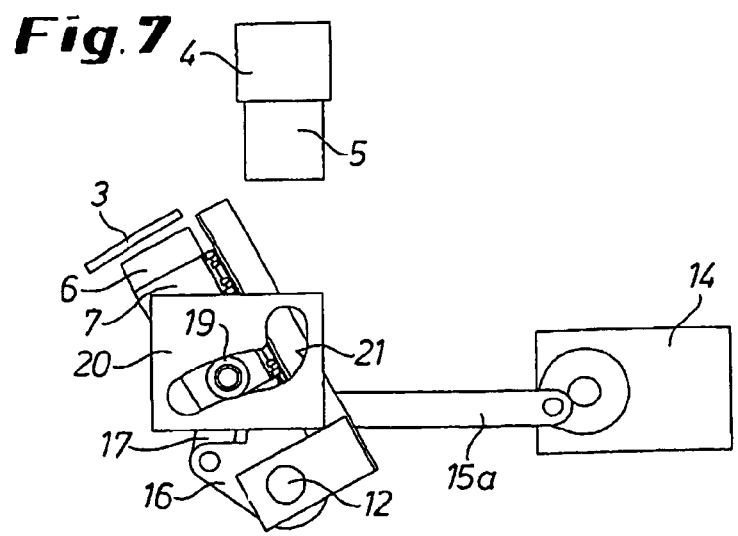

APPARATUS FOR MAKING HOLLOW BODIES FROM THERMOPLASTIC FILM

FIELD OF THE INVENTION

The present invention relates to the manufacture of hollow bodies. More particularly this invention concerns making hollow bodies from a thermoplastic film.

BACKGROUND OF THE INVENTION

A typical apparatus for making hollow bodies from thermoplastic film has a step-type film feeder, an upper tool arranged above the film and a lower traverse for accommodating a lower tool, in particular a combined shaping and punching tool. The lower traverse is shiftable in a pivotal frame below the film in a vertically slidable manner and can be swung out with the pivotal frame, wherein the lower traverse is connected to a drive via a slider crank drive having cam-controlled crank arms.

An apparatus of this type is known from EP 1 314 536. A lower table or lower traverse slidable on a bridge frame that is pivotal around an axis is held on the pivoting bridge via toggle-linkage arms. The toggle arms are acted on via a first connecting rod by a drive arranged to the side that via a further second connecting rod also causes the pivot motion of the pivoting bridge with the lower traverse. The movements introduced via the two reciprocating rods are controlled by cam disks acting on levers pivoted on the reciprocating rods. The horizontal motion and the pivot motion proceed in an overlapping manner until a certain angular position of the toggle lever arms.

A thermoshaping machine is known from DE 197 10 475 in which the lower traverse or lower table is supported via a pair of levers hinged in a lower bearing block. The lower lever bears via a roller provided under the bearing block articulation point against a driven cam disk rotating at a constant speed. A separate pivoting table carrying the tool is mounted in or on the lower traverse. This pivoting table is connected to the lower traverse by means of a pivot bolt that forms the pivot axis of the table. The pivoting table engages with at least one roller in at least one groove of a cam, whereby, with the lowering movement of the lower traverse controlled by the cam disk via the pair of levers, the separate pivoting table is shifted into a pivoted position to release or receive the finished articles. While the lower traverse moves downward in a straight manner, the roller of the pivoting table follows the curve of the guide groove, so the pivoting table at first performs a straight lowering movement and subsequently a pivot movement in the curved section of the guide groove. The pair of levers that is not rotatable along with the pivoting table is connected to the roller only indirectly via the lower table or lower traverse.

The cam disks have proven to be a disadvantage with the known apparatuses, since a change in the sequence of motions necessitates a complex switching of the cam disks, which furthermore are expensive. Moreover, they are susceptible to faults because of the numerous lever pivot points and necessitate a large construction height, in particular with a lever support of the lower traverse from below, wherein then furthermore the levers and their spherical plain bearings have to absorb the large forces upon closing the tables for shaping and subsequent punching out of the finished articles.

OBJECTS OF THE INVENTION

It is therefore an object of the present invention to provide an improved apparatus for making hollow bodies from thermoplastic film.

Another object is the provision of such an improved apparatus for making hollow bodies from thermoplastic film that overcomes the above-given disadvantages, in particular that renders possible in particular a variable operation and an ergonomic construction of a thermoshaping machine.

SUMMARY OF THE INVENTION

An apparatus for forming shaped bodies from a thermoplastic film has according to the invention a stationary support, a downwardly directed upper tool fixed on the support, means for feeding the film in a transport direction in steps underneath the upper tool, a lower shaft pivotal in support below the traverse, a frame carried on the shaft and pivotal thereon about an axis of the shaft, an upwardly directed lower tool shiftable on the frame toward and away from the axis, a pair of arms extending radially from the shaft, a link extending between one of the arms and the lower tool, and a crank drive element. A connecting rod extends between the other of the arms and the crank drive element. A stationary cam adjacent the frame has a nonstraight cam formation, and a cam follower on the tool engages the cam formation. A drive rotates the crank drive element and thereby simultaneously pivots the shaft about the axis, shifts the lower tool along the frame, and moves the follower along the cam formation. This action shifts the lower tool between an upper position pinching the film against the upper tool and a lower unloading position offset in the direction from the upper position.

Since according to the invention the other arm at the site of the action is pivoted to pivot the entire lower traverse as a unit with the tool, namely on the pivot shaft defining the axis of the pivotal frame, and thus the link as well as the connecting rod have their bearing in the lower toggle arm, a machine with low construction height with ergonomic, pleasant working height can also be achieved with the use of a two angularly offset arms. Furthermore no vertically moveable lower table bearing a pivoting table is necessary.

No separate cam disks and several lever arrangements are necessary for the lifting and pivoting motion, instead the same pair of arms is effective for the one as well as for the other movement direction via the track rollers engaging in the fixed cams, only one drive being necessary, preferably a servomotor. The rotational speed thereof can be easily changed during a pivot lift so that a desired sequence of motions of the tilting movement including a gentle approach to the dead-center positions can be achieved. Since, moreover, the lifting motion and pivot motion are mechanically synchronized, there is no risk of collision, i.e. no overlapping of the sequence of motions can occur.

The compact low construction of the thermoshaping machine, in which the point of application of the connecting rod on the lower arm is provided spaced apart from the joint of the two crank arms, the lower arm being advantageously embodied in one piece in a V-shape or double-armed for the two individual articulation points, renders possible an operation with a very small pivot angle. For even with a pivot angle of only approximately 30°, the lower traverse pivoted over the pivot frame together with the shaping tool already adopts a position lying at an accessible working height for unloading the finished articles. This provides better support during the stacking of cups and in particular with lids that can otherwise be stacked horizontally only with great difficulty.

A preferred embodiment of the invention provides that the drive has two connecting rods spaced apart from one another in a parallel manner and connected with their assigned crank arms to the cam-driven lower traverse. The application of the high closing forces and the lifting movements of the lower traverse guided in the pivot frame are promoted by the double slider crank drive acting on the pivot shaft.

It is proposed in terms of embodiment that at the same time the upper toggle arm with its free end is supported on the pivot pin or pivot pins bearing the track rollers. This can thus be a one-piece pivot pin guided transversely through the lower traverse or advantageously two coaxial pivot pins can be provided. Alternatively, it is possible to embody separate bearing stumps or journal pins on the lower traverse for the track rollers and the articulation points of the upper crank arms.

One proposal of the invention provides that the lower traverse has straight guides arranged on both sides, the moving parts of which straight guides are provided on the lower traverse and the guide tracks thereof on the pivotal frame. Tilting moments about the horizontal transverse axis can be absorbed with the straight guides, for example, recirculating roller guides.

According to an advantageous embodiment of the invention, the pivot pins bearing the toggle arm or—in the case of the double crank drive—the two upper crank arms on the lower traverse are embodied eccentrically, a track roller running on the lower track of the cam being arranged on the one eccentric section and a track roller running on the upper track of the cam is arranged on another eccentric section.

According to an advantageous alternative construction, the pivot pins bearing the toggle arm or the two upper crank arms on the lower traverse are cylindrical and support coaxially next to one another two track rollers, which roll on adjacent tracks of the cam offset in height to one another, which tracks can be embodied according to one embodiment of the invention in respectively one separate sliding disk.

Both cases make it possible that the direction of rotation of the track rollers on the way through the cam is clearly determined and cannot be reversed through an undefined position of the track rollers one up and one down in the cam, which would lead to substantially faster wear.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 5 is a side view of the shaping station according to FIG. 1 with an open tool, i.e. a lowered lower traverse;

FIG. 6 is a side view like FIG. 5, but in an intermediate position pivoted to unload the finished articles;

FIG. 7 is a side view like FIG. 6, but pivoted out into an end position for unloading the finished articles;

SPECIFIC DESCRIPTION

Figure 1:
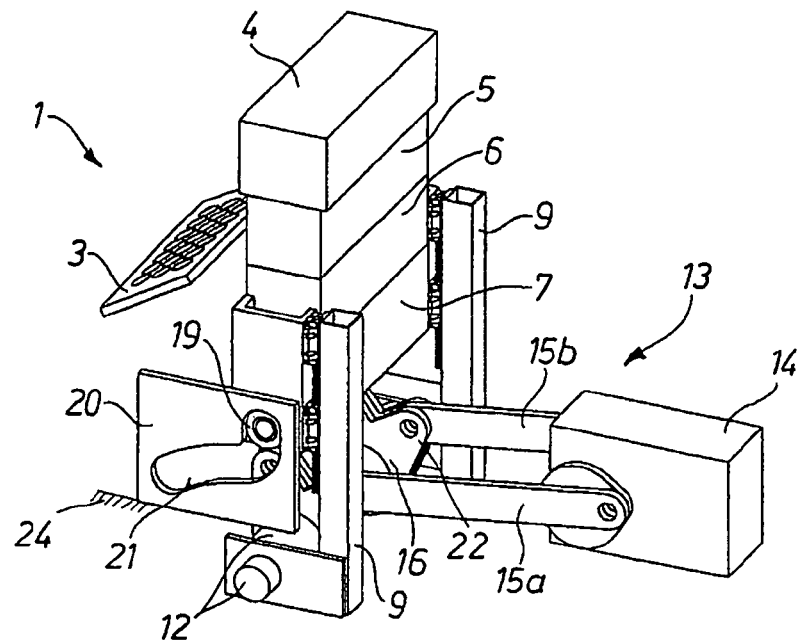
FIG. 1 is a perspective overall view of the shaping station of a thermoshaping machine without its known peripheral system parts such as winding rollers and unwinding rollers for the plastic film, film feeder, and heater.
Figure 2:
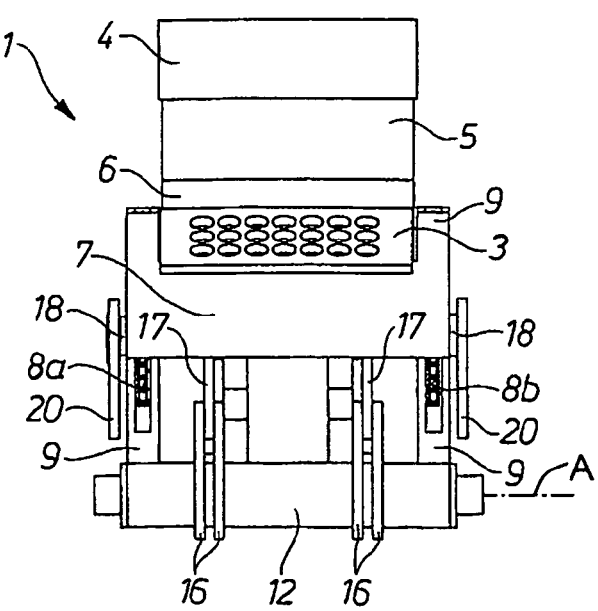
FIG. 2 is a front view of the shaping station according to FIG. 1 in the closed position, seen from the discharge side with a collecting or stacking plate for stacking the finished products.

As seen in FIGS. 1 through 8, a thermoshaping machine has a shaping station 1 with a stacker provided in the form of a collecting or stacking plate 3 in the travel direction D of a film 2 (cf. FIG. 3) fed horizontally in steps by a feeder shown schematically at 25 (FIG. 3), in which stacker the finished articles produced from the film 2 are stacked. The shaping station 1 has an upper tool 5 attached to a rigid upper traverse 4 fixed to a stationary support shown schematically at 24 and optionally embodied as a combined shaping/punching tool, and a lower traverse 7 supporting a lower vertically shiftable and pivotal tool 6.

Figure 9:
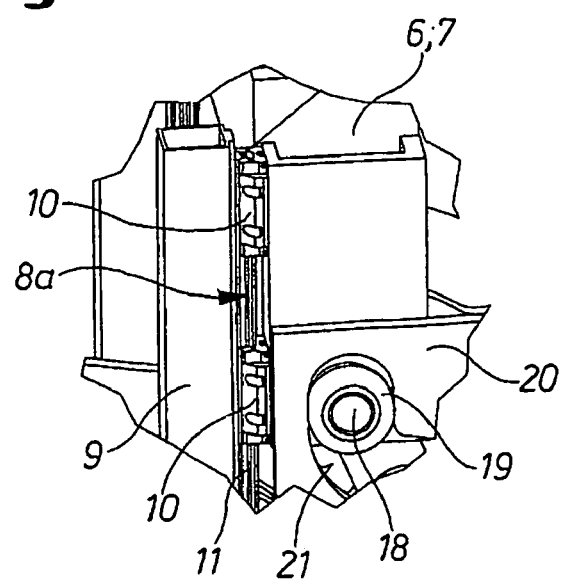
FIG. 9 is a perspective view of a detail of the shaping station, namely the straight guide of the lower traverse in the pivotal frame.
Figure 10:
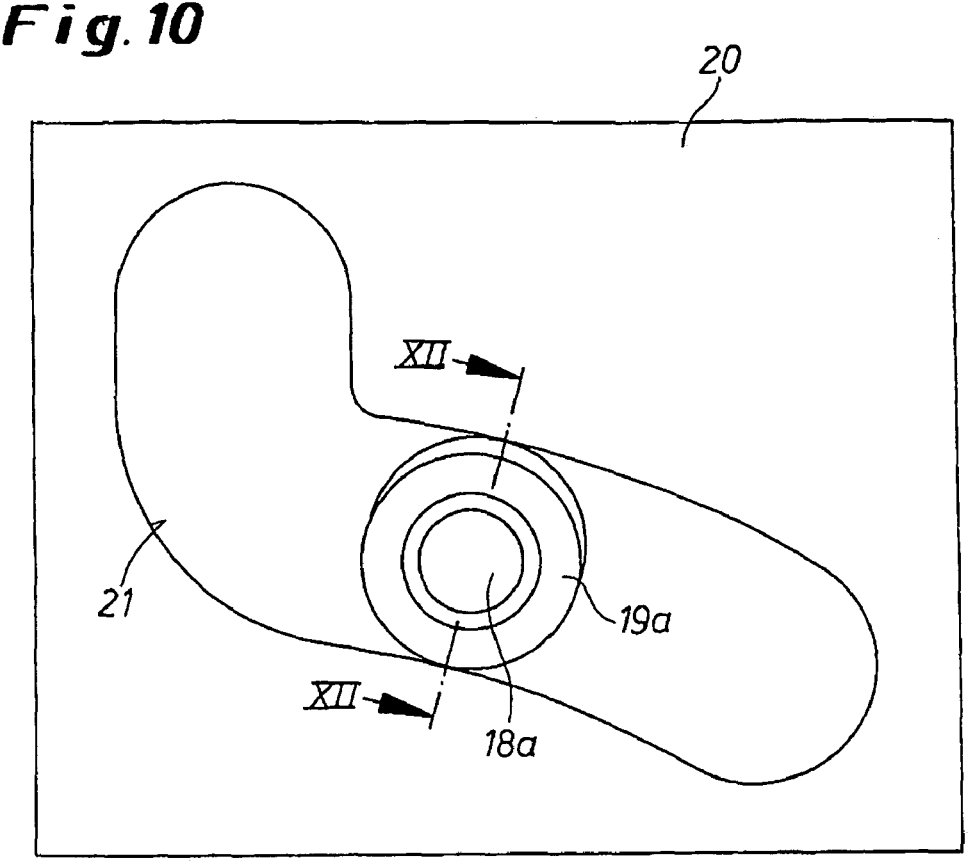
FIG. 10 is a detail view of fixed cam with track roller of the lower traverse guided therein of the shaping tool.
Figure 11:
FIG. 11 is a top view of the cam according to FIG. 10.
Figure 12:
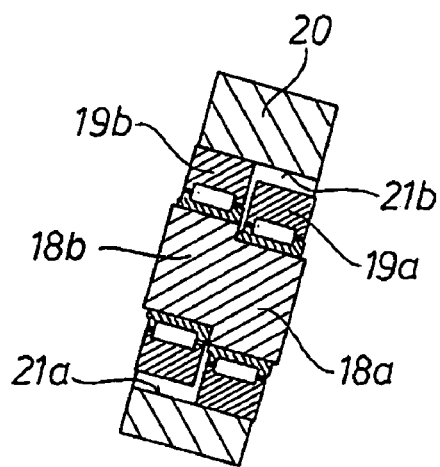
FIG. 12 is a section along line XII-XII of FIG. 10.
Figure 13:
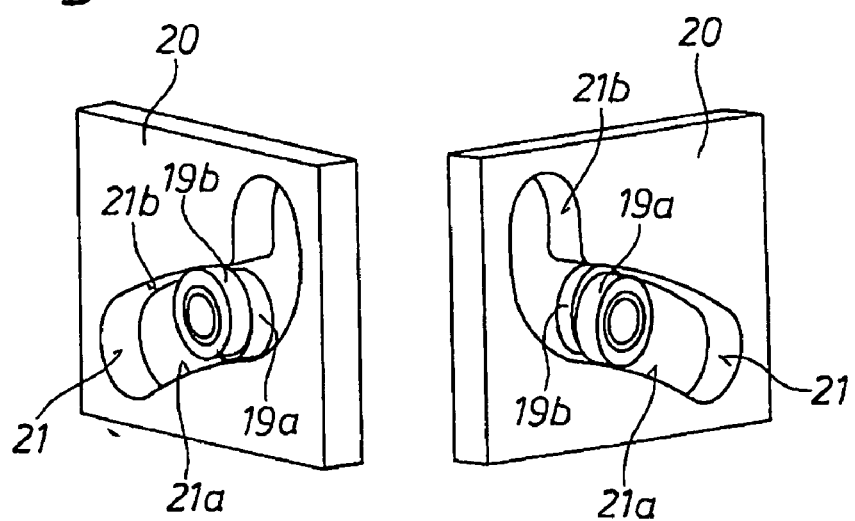
FIG. 13 is a schematic perspective view of the cams and track rollers according to FIGS. 10 through 12.

The lower traverse 7 with the lower tool 6 is guided on both sides in straight guides 8a and 8b of a pivotal frame 9. The moving parts or guide shoes 10 of the guides 8a and 8b are mounted on the lower traverse 7 or lower tool 6 and the guide rails 11 thereof on which the shoes 10 move are mounted on the pivotal frame 9 (see FIG. 9). For pivoting the pivotal frame 9 together with the lower traverse 7 guided therein including the lower tool 6, a common horizontal shaft 12 extending perpendicular to the direction D and pivoted on the support 24 is provided on the lower end of the frame 9, relative to which the frame 9 can pivot. This shaft 12 also defines a rotation axis A of the entire unit. A slider crank drive 13 acts on the pivot shaft 12. This drive 13 comprises a servomotor 14 that may have a built-in transmission and two connecting rods 15a and 15b acted on thereby and spaced apart from one a parallel to the axis A.

Figure 14:
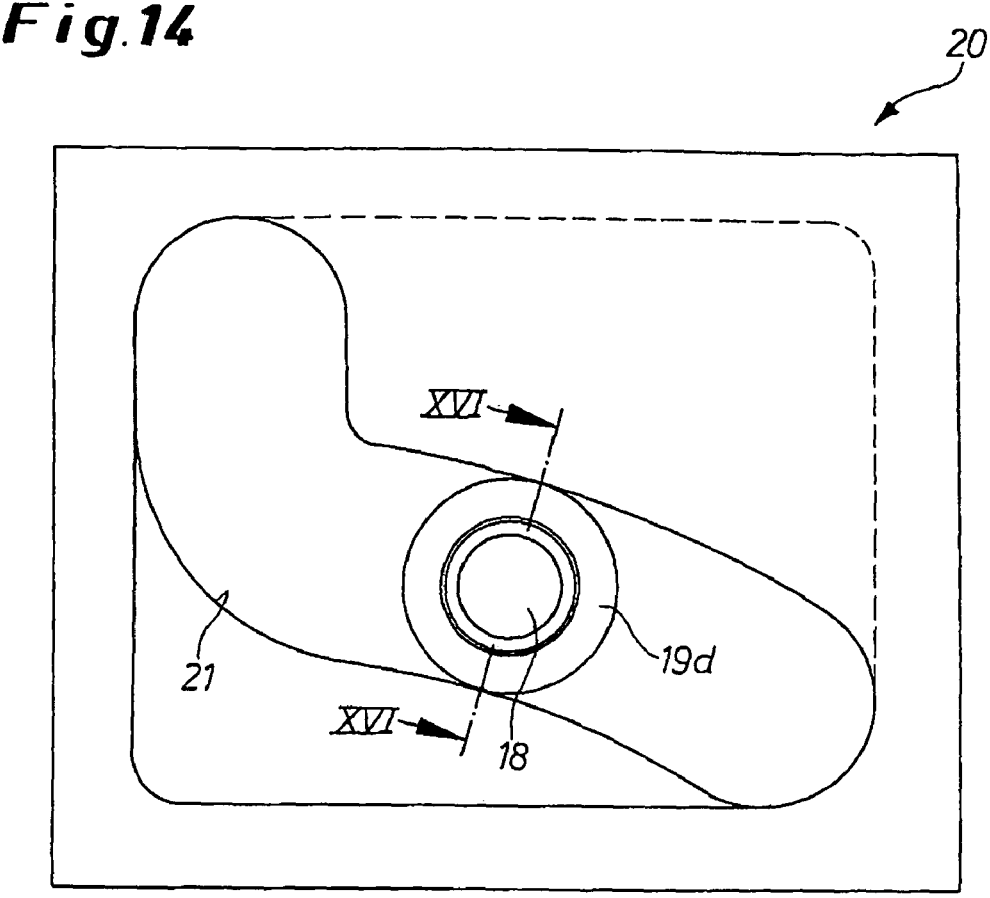
FIG. 14 is an end view of another a fixed cam with track rollers guided therein.
Figure 15:
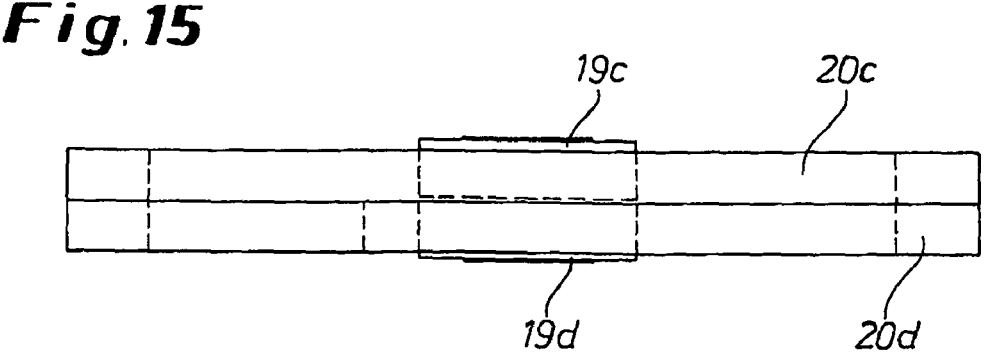
FIG. 15 is a top view of the cam according to FIG. 14.
Figure 16:
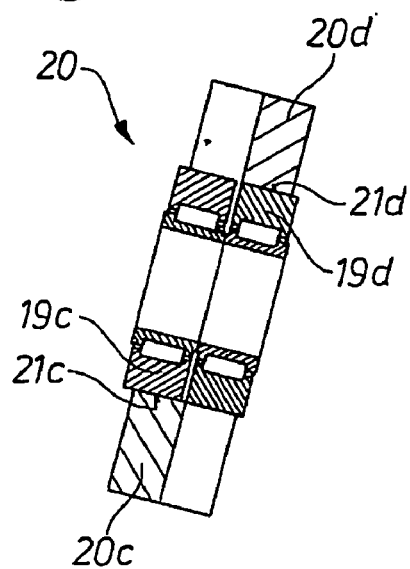
FIG. 16 is a section along line XVI-XVI if FIG. 14.
Figure 17A:
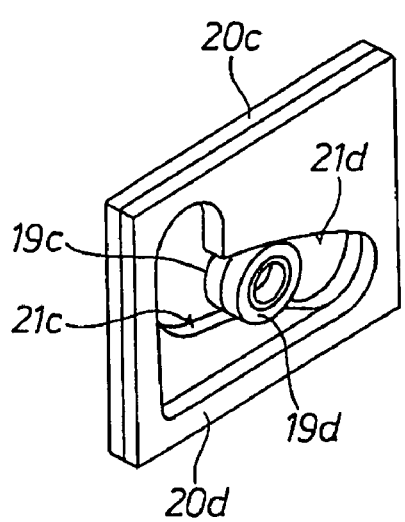
FIGS. 17a and 17b are perspective views of the cam with the track rollers guided therein according to FIGS. 14 through 16.
Figure 17B:
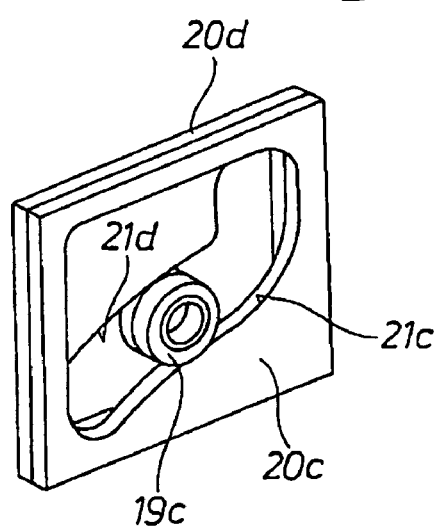

Two V-shaped or double-armed lower link plates 16 are fixed on the pivot shaft 12 and have first arms 22 with outer ends pivoted on the respective connecting rods 15a and 15b as well as second arms 23 angularly offset therefrom and pivoted on links 17 whose opposite ends (see FIG. 8) are pivoted on the lower traverse 7 on pivot pins whose outer ends carry track rollers 19. These track rollers 19 engage in fixed cam slots 21 formed in stationary cam plates 20. The cam slots 21 are generally L-shaped with a short substantially vertical upper leg extending radially from the axis A and from whose lower end a downwardly angled lower leg (see FIG. 14) extends that is a circular arc centered on the axis A. Each arm 23 forms a toggle linkage with the respective link 17.

Figure 3:
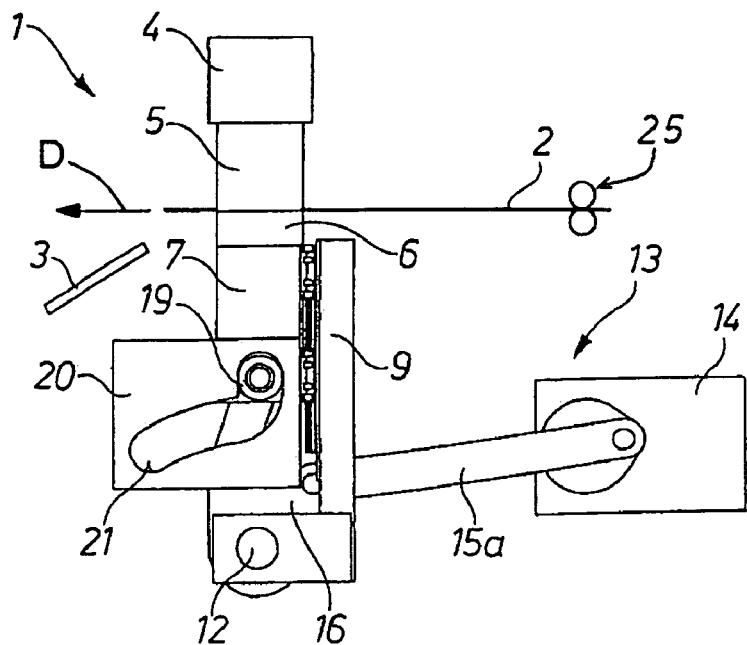
FIG. 3 is a side view of the shaping station according to FIG. 1.
Figure 4:
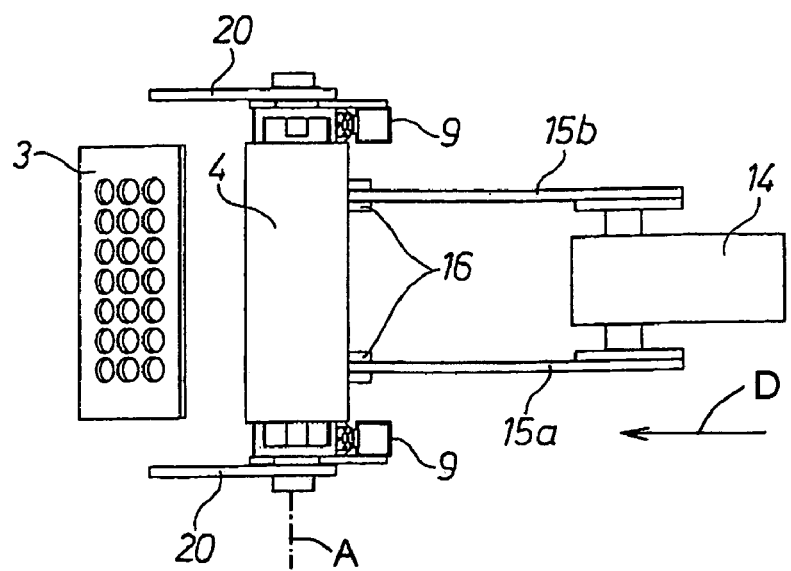
FIG. 4 is a top view of the shaping station according to FIG. 1.
Figure 8:
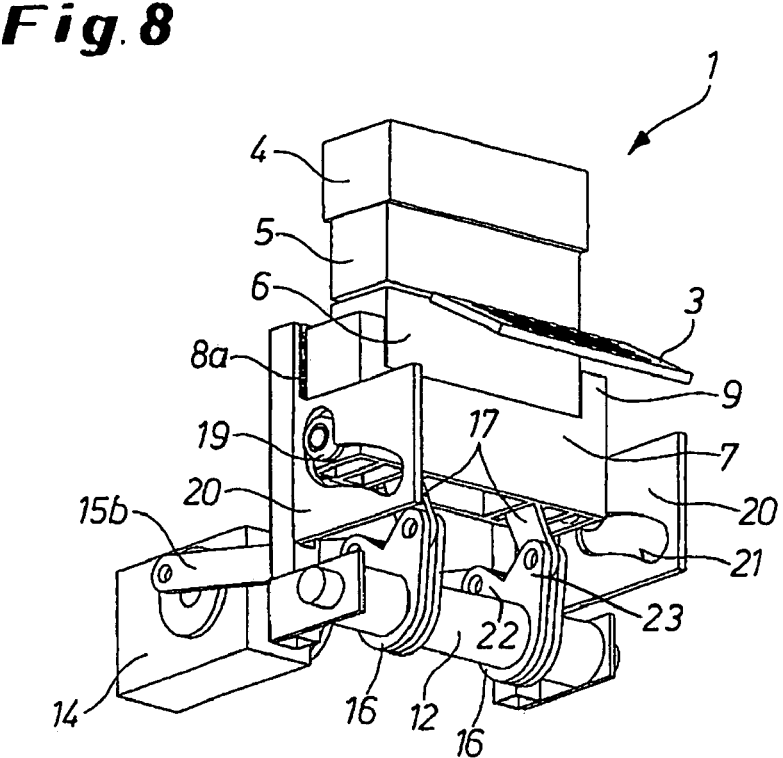
FIG. 8 is a perspective bottom view of the shaping station according to FIG. 1.

Thus, starting from a closed position as shown in FIG. 3 with the rollers 19 in the upper end of the upper leg of the slot 21 and the tool 7 in an uppermost position pressing against the lower face of the upper tool 5, rotation of the shaft 12 in a counterclockwise direction as seen in FIGS. 3 and 5-7 will first pull the tool 6 straight downward as shown in FIG. 5 until the rollers 19 reach the upper ends of the lower legs of the slots 21. Further counterclockwise rotation will cause the entire lower-tool assembly 6-9 to pivot counterclockwise about the axis A through the position of FIG. 6, thereby tilting the tool 6 in the direction D from alignment underneath the upper tool 5 to a tilted position shown in FIG. 7 aligned underneath the stacking plate 3.

In the closed upper-end position shown in FIG. 3 the foil 2 is punched and/or shaped between the tools 5 and 6. The motor 14 holds the parts in this position long enough for the operation to be completed. Similarly in the open lower-end position of FIG. 7 the finished workpiece is knocked out of the lower tool 7 and stacked on the plate 7, or even suctionally gripped and moved to the plate 7. Once again, the motor 14 halts and holds in the FIG. 7 position. Furthermore, due to the toggle action of the arms 23 and respective links 17, the parts slow to a stop with each arm 23 forming a straight line with the respective link 17 at each end of its travel, with the concomitant force amplification that is useful in the closed position.

Not only is the assembly 4-9 constrained to follow these movements by the shapes of the slots 21, but the crank-type drive 13 applies a pushing movement in the direction D during downward movement and a pulling direction opposite the direction D during upward movement, reducing wear of the rollers 19 and cam formation 21.

FIGS. 10 through 13 show an arrangement of two track rollers 19a and 10b guided in each of the cam slots 21 of the cam plates 20. The pivot pins supporting the track rollers 19a and 10b have sections 18a and 18b that are cylindrical but with parallel offset axes so that one roller 19a bears on one inner edge of the respective slot 21 and the other roller 19b bears on the opposite inner edge of the respective slot 21. This ensures extremely smooth movement since the rollers 19a and 10b can in fact be prestressed somewhat against the respective cam edges, completely eliminating play. This would not be possible with a single roller that would have to be underdimensioned slightly so as not to bind.

The same extremely effective effect can be achieved if two track rollers 19c and 19d are supported coaxially next to one another on the pivot pin or pivot pins, as shown in FIGS. 14 through 17, to which adjacent tracks 21c and 21d offset in height with respect to one another are assigned, which thus provide a separate cam for each track roller 19c or 19d. The cam slots or tracks 21c and 21c are hereby embodied in separate cam plates 20c and 20d assembled in pairs

I claim:

1. An apparatus for forming shaped bodies from a thermoplastic film, the apparatus comprising:
   a stationary support;
   a downwardly directed upper tool fixed on the support;
   means for feeding the film in a transport direction in steps underneath the upper tool;
   a lower shaft extending along pivotal about a lower axis in the support below the upper tool;
   a frame carried on the shaft and pivotal thereon about the lower axis of the shaft;
   an upwardly directed lower tool shiftable on the frame toward and away from the lower axis;
   a link plate pivotal about the lower axis and formed with a pair of arms extending radially from the shaft angularly offset from each other;
   a link extending between one of the arms and the lower tool;
   a crank drive element;
   a connecting rod extending between the other of the arms and the crank drive element;
   a stationary cam the frame, fixed relative to the support, and having a nonstraight cam formation;
   a cam follower on the tool engaging the cam formation; and
   drive means for rotating the crank drive element and thereby simultaneously pivoting the shaft about the lower axis, shifting the lower tool along the frame, and moving the follower along the cam formation and for shifting the lower tool between an upper position pinching the film against the upper tool and a lower unloading position offset in the direction from the upper position.

2. The apparatus defined in claim 1 wherein the link is pivoted on the lower tool at an upper axis parallel to the lower axis.

3. The apparatus defined in claim 1 wherein the tool has an upper shaft on which the link is pivoted and having an outer end carrying the cam follower.

4. The apparatus defined in claim 1 wherein the lower traverse carries a pair of such cam followers centered on an upper axis above and generally parallel to the shaft axis, the cam having two parts juxtaposed with the cam followers and each having one of the cam followers.

5. The apparatus defined in claim 4 wherein there are two such axially spaced connecting rods and pairs of arms.

6. The apparatus defined in claim 1 wherein the crank element is a rotatable wheel, the apparatus further comprising a step motor for rotating the wheel.

7. The apparatus defined in claim 1 wherein the cam formation is a slot and the cam follower includes at least one roller carried on the lower tool and riding in the slot.

8. The apparatus defined in claim 7 wherein the cam follower includes two such rollers rotatable about axes offset from but parallel to each other, the slot having a pair of confronting edges against one of which one of the rollers bears and against the other of which the other of the rollers bears.

9. The apparatus defined in claim 6 wherein the follower includes two such rollers rotatable about the same axis and axially offset from each other, the cam slot having a pair of axially offset confronting edges against one of which one of the rollers bears and against the other of which the other of the rollers bears.

10. The apparatus defined in claim 9 wherein the cam is formed by two plates each forming a respective one of the edges.

* * * * *

UNITED STATES PATENT AND TRADEMARK OFFICE
CERTIFICATE OF CORRECTION

PATENT NO. : 8,105,069 B2
APPLICATION NO. : 12/497860
DATED : January 31, 2012
INVENTOR(S) : Frank-Michael Wölk Page 1 of 1

It is certified that error appears in the above-identified patent and that said Letters Patent is hereby corrected as shown below:

The name of the Assignee should be written as:

Gabler Thermoform GmbH & Co. KG

Signed and Sealed this
Third Day of April, 2012

David J. Kappos
*Director of the United States Patent and Trademark Office*